US008886490B2

(12) United States Patent
Baek

(10) Patent No.: US 8,886,490 B2
(45) Date of Patent: Nov. 11, 2014

(54) CRASH DETECTION APPARATUS AND METHOD

(71) Applicant: LG Chem, Ltd., Seoul (KR)

(72) Inventor: Seongmun Baek, Anyang-si (KR)

(73) Assignee: LG Chem, Ltd., Seoul (KR)

( * ) Notice: Subject to any disclaimer, the term of this patent is extended or adjusted under 35 U.S.C. 154(b) by 221 days.

(21) Appl. No.: 13/633,592

(22) Filed: Oct. 2, 2012

(65) Prior Publication Data

US 2013/0124138 A1 May 16, 2013

Related U.S. Application Data

(63) Continuation of application No. PCT/KR2012/004626, filed on Jun. 12, 2012.

(30) Foreign Application Priority Data

Nov. 10, 2011 (KR) .......................... 10-2011-0116749
Jun. 11, 2012 (KR) .......................... 10-2012-0062295

(51) Int. Cl.
*G01P 15/00* (2006.01)
*H01M 10/44* (2006.01)
*G01P 15/18* (2013.01)
*H01M 2/10* (2006.01)
*B60R 16/023* (2006.01)
*H01M 10/42* (2006.01)

(52) U.S. Cl.
CPC ............... *G01P 15/18* (2013.01); *H01M 10/44* (2013.01); *Y02E 60/12* (2013.01); *H01M 2010/4271* (2013.01); *H01M 2/1083* (2013.01); *H01M 10/42* (2013.01); *H01M 2220/00* (2013.01); *H01M 10/4257* (2013.01); *H01M 2220/20* (2013.01); *B60R 16/0234* (2013.01)
USPC .......................................................... 702/141

(58) Field of Classification Search
CPC ..... G06F 1/00; G06F 2003/00; G06F 2101/00; G06F 2200/00; G06F 2201/00
USPC ......................................... 702/141, 182–185
See application file for complete search history.

(56) References Cited

U.S. PATENT DOCUMENTS

2008/0042410 A1 * 2/2008 Breed et al. ................... 280/735

FOREIGN PATENT DOCUMENTS

| JP | 2005-263178 A | 9/2005 |
| KR | 10-2011-0060166 A | 6/2011 |
| KR | 10-2011-0061973 A | 6/2011 |
| KR | 10-1056238 B1 | 8/2011 |

* cited by examiner

*Primary Examiner* — Edward Raymond
(74) *Attorney, Agent, or Firm* — Birch, Stewart, Kolasch & Birch, LLP

(57) ABSTRACT

A crash detection apparatus includes a crash detection unit and first, second, and third acceleration sensors which are installed at different positions of the object whose crash is to be detected. The crash detection unit calculates expectation acceleration of the third acceleration sensor based on measurement information obtained by the first acceleration sensor and the second acceleration sensor, compares the expectation acceleration with a measured acceleration measured by the third acceleration sensor, and detects whether a shape of the object has been deformed or not.

20 Claims, 5 Drawing Sheets

CRASH DETECTION APPARATUS AND METHOD

TECHNICAL FIELD

This application claims the benefit of priority of Korean Patent Applications No. 10-2011-0116749 filed on Nov. 10, 2011, and 10-2012-0062295 filed on Jun. 11, 2012 and, all of which is incorporated by reference in its entirety herein.

The present invention relates to a crash detection apparatus and method and, more particularly, to a crash detection apparatus and method using a plurality of acceleration sensors.

BACKGROUND

In various fields, such as electronic products, vehicles and the parts of vehicles, vessels, pieces of equipment of factories, and buildings themselves which are sensitive to crash, it is essential to detect whether crash has been generated or not in the object of each field in terms of the production and maintenance and repair of the object.

To this end, various methods of detecting whether crash has been generated or not have been devised and used. A representative example of the methods includes a crash detection method and apparatus using an acceleration sensor.

As one example of crash detection methods and apparatuses using an acceleration sensor, Korean Patent No. 1056238 entitled 'Battery Pack' discloses a battery pack for detecting crash applied thereto by using an acceleration sensor embedded in the battery pack.

A conventional crash detection method and apparatus using an acceleration sensor, such as that disclosed in Korean Patent No. 1056238, however, is problematic in that they may detect only whether crash has been generated or not by measuring acceleration of a specific level or higher through the acceleration sensor, but cannot detect a position where the crash has been generated or the deformation of an outward shape resulting from the crash.

DETAILED DESCRIPTION

Technical Problem

The present invention provides a crash detection apparatus and method which are capable of detecting whether crash has been generated or not and also detecting a position where the crash has been generated, the amount of the crash, and whether or not an outward shape has been deformed owing to the crash.

Technical Solution

According to an embodiment of the present invention, an apparatus for crash detection includes first, second, and third acceleration sensors installed at different positions of an object whose crash is to be detected, and a crash detection unit configured to calculate expectation acceleration of the third acceleration sensor based on measurement information measured by the first acceleration sensor and the second acceleration sensor, and detect whether a shape of the object has been deformed or not by comparing the expectation acceleration with a measured acceleration measured by the third acceleration sensor.

The crash detection unit may be configured to detect that the shape of the object has been deformed if a difference between the expectation acceleration and the measured acceleration is out of a predetermined range.

The crash detection unit may include a crash information storage unit configured to store information regarding at least one of a position where the third acceleration sensor is installed, the measurement information measured by the first acceleration sensor and the second acceleration sensor, the expectation acceleration, and the measured acceleration when the shape of the object is determined as deformed.

The crash detection unit may include a position information storage unit configured to store position information including vector information about a distance between the first, the second and the third acceleration sensors and directions of the first, the second, and the third acceleration sensors.

The crash detection unit may be configured to calculate the expectation acceleration of the third acceleration sensor based on the position information and the measurement information measured by the first acceleration sensor and the second acceleration sensor.

The plurality of acceleration sensors may measure 3-axis accelerations which are perpendicular to each other.

The crash detection unit may be configured to calculate an amount of crash at a position where the third acceleration sensor is installed using a difference between the expectation acceleration and the measured acceleration.

According to another embodiment of the present invention, a method for crash detection includes measuring a first acceleration at a first position of an object whose crash is to be detected, measuring a second acceleration at a second position of the object, calculating an expectation acceleration at a third position of the object based on the first acceleration and the second acceleration, measuring a third acceleration at the third position of the object, and detecting whether a shape of the object has been deformed or not by comparing the expectation acceleration with the third acceleration.

The shape of the object may be detected as deformed if a difference between the expectation acceleration and the third acceleration is out of a predetermined range.

The expectation acceleration may be calculated based on the first acceleration, the second acceleration and position information about the first position and the second position.

The first, the second and the third acceleration may include 3-axis accelerations which are perpendicular to each other.

The method may further include storing crash information regarding at least one of the third position, the first acceleration, the second acceleration, the expectation acceleration, and the third acceleration when the shape of the object is detected as deformed.

The method may further include displaying the crash information together with a crash detection signal informing the detection of crash when the shape of the object is detected as deformed.

The method may further include calculating an amount of crash at the third position by using a difference between the expectation acceleration and the third acceleration.

According to another embodiment of the present invention, a method for crash detection includes measuring a plurality of accelerations at a plurality of positions through a plurality of acceleration sensors, calculating an expectation acceleration at a detection position by using at least two of the plurality of accelerations, and determining that deformation occurs at the detection position if a difference between the expectation acceleration and the acceleration at the detection position is out of a predetermined range.

The plurality of accelerations may include 3-axis accelerations which are perpendicular to each other.

The method may further include displaying a crash detection signal informing the detection of crash when deformation occurs at the detection position.

The method may further include displaying crash information regarding at least one of the detection position, the expectation acceleration, and the acceleration at the detection position when deformation occurs at the detection position.

The method may further include calculating an amount of crash at the detection position using a difference between the expectation acceleration and the acceleration at the detection position.

According to another embodiment of the present invention, an apparatus for crash detection, the apparatus comprising a plurality of acceleration sensors installed at different positions of an object whose crash is to be detected, and a crash detection unit configured to detect whether a shape of the object has been deformed or not by using the plurality of acceleration sensors.

The crash detection unit may include a calculation unit configured to calculate an expectation acceleration at a detection position based on acceleration information measured by at least two of the plurality of acceleration sensors except an acceleration sensor installed at the detection position, and a determination unit configured to compare the expectation acceleration with an acceleration measured by the acceleration sensor at the detection position and determine that deformation occurs at the detection position if a difference between the expectation acceleration and the acceleration at the detection position is out of a predetermined range.

The crash detection unit may include a position information storage unit configured to store position information including vector information about a distance between the plurality of acceleration sensors and directions of the plurality of acceleration sensors.

The calculation unit may calculate the expectation acceleration based on the position information and the acceleration information.

The plurality of acceleration sensors may measure 3-axis accelerations which are perpendicular to each other.

The crash detection unit may include a crash information storage unit configured to store information regarding at least one of at the detection position, the expectation acceleration, and the measured acceleration when the shape of the object is determined as deformed.

The determination unit may be configured to determine that the crash occurs at a position where a measure acceleration is greater than a predetermined threshold

Advantageous Effects

The crash detection apparatus and method according to the present invention can detect whether crash has been generated or not and also detect a position where the crash has been generated, the amount of the crash, and whether or not an outward shape has been deformed owing to the crash.

MODE FOR INVENTION

Figure 1:
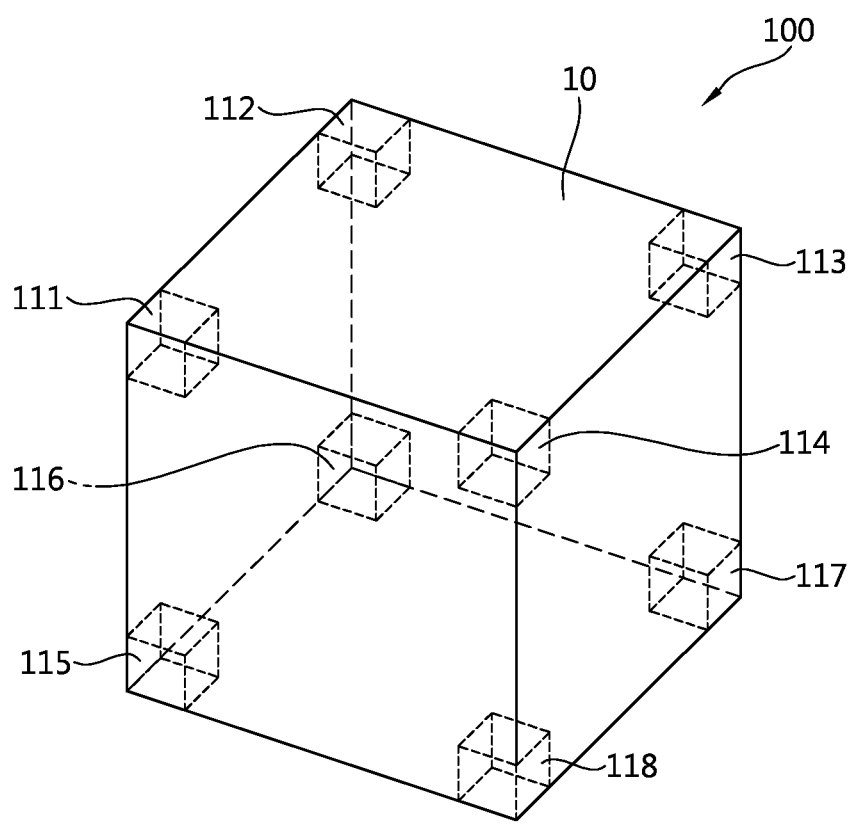
FIG. 1 is a diagram showing an example in which a crash detection apparatus according to an embodiment of the present invention is installed.

FIG. 1 is a diagram showing an example in which a crash detection apparatus according to an embodiment of the present invention is installed.

As shown in FIG. 1, the crash detection apparatus 100 according to the embodiment of the present invention includes a plurality of acceleration sensors 111 to 118 installed at different positions.

A 3-axis acceleration sensor for measuring the accelerations of 3-axis directions vertical to each other may be used as each of the acceleration sensors 111 to 118.

In the present embodiment, the plurality of acceleration sensors 111 to 118 is illustrated as being installed at the respective corners of the object whose crash will be detected 10. This is because the vertex parts of the object whose crash will be detected 10 are most easily deformed when crash is applied to the object whose crash will be detected 10.

However, the positions of the acceleration sensors and the number of acceleration sensors may be changed in various manners, if necessary. For example, the acceleration sensors may be installed inside and/or outside the object whose crash will be detected 10, or the acceleration sensors may be installed at the respective faces of the object whose crash will be detected 10. Three or more acceleration sensors may be disposed at different positions of the object whose crash will be detected 10.

Figure 2:
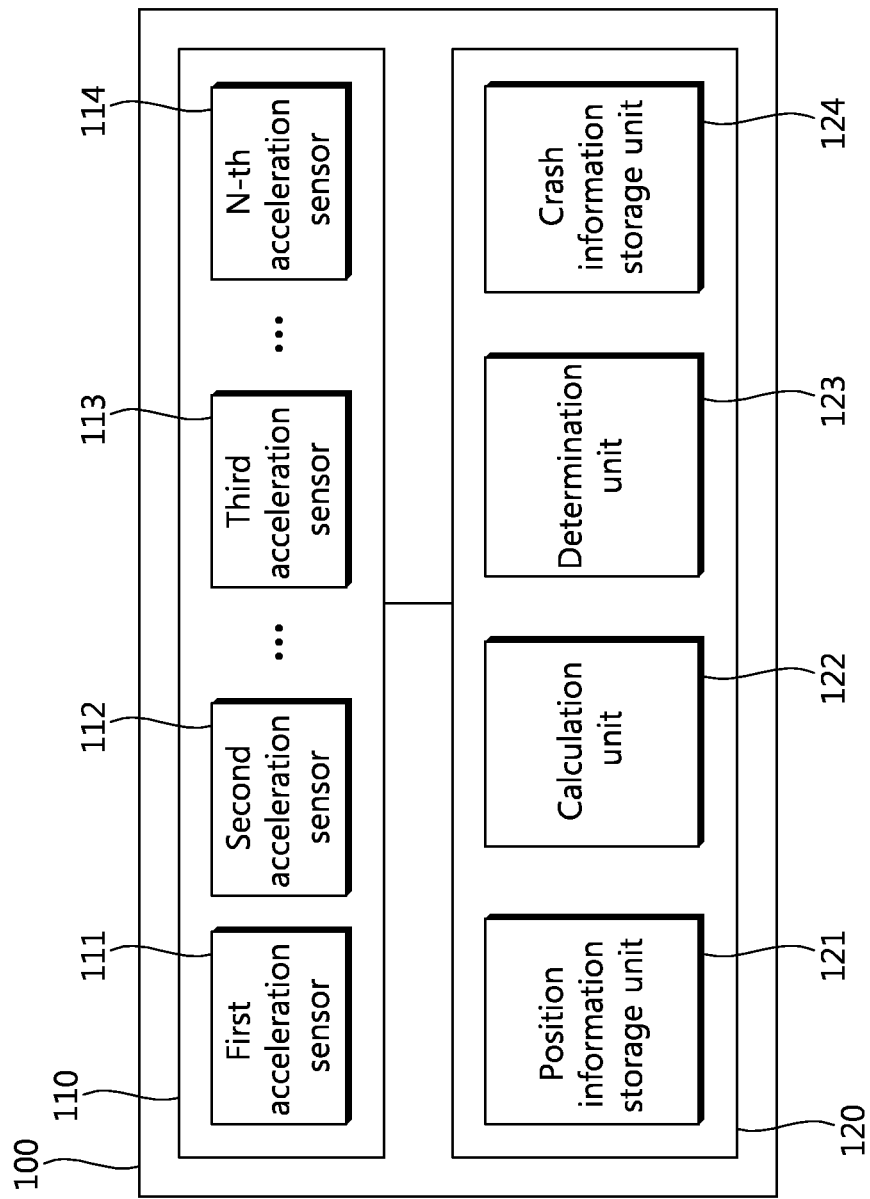
FIG. 2 is a block diagram of the crash detection apparatus according to the embodiment of the present invention.

FIG. 2 is a block diagram of the crash detection apparatus according to the embodiment of the present invention.

As shown in FIG. 2, the crash detection apparatus 100 according to the present embodiment includes a sensor unit 110 and a crash detection unit 120.

The sensor unit 110 includes a plurality of acceleration sensors 111 to 114 installed in the object whose crash will be detected 10.

The crash detection unit 120 may include a position information storage unit 121, a calculation unit 122, a determination unit 123, and a crash information storage unit 124.

The position information storage unit 121 may store pieces of information about the positions of the plurality of acceleration sensors 111 to 114, including vector information about the distance between the plurality of acceleration sensors 111 to 114 and a direction angle of each of the plurality of acceleration sensors 111 to 114 and/or coordinate information about coordinates at which each of the plurality of acceleration sensors 111 to 114 is installed.

The calculation unit 122 may receive information about the acceleration of each position from the plurality of acceleration sensors 111 to 114 and calculate expectation acceleration at a specific point based on the received information. Here, the calculation unit 122 may receive information about the positions of the plurality of acceleration sensors 111 to 114 from the position information storage unit 121 and use the received information to calculate the expectation acceleration at the specific point.

For example, the calculation unit 122 may calculate expectation acceleration at a point where, for example, the third acceleration sensor 113, that is, the object whose possible crash will be detected, is placed on the basis of pieces of acceleration information measured by, for example, the first acceleration sensor 111 and the second acceleration sensor 112.

That is, the calculation unit 122 receives the pieces of acceleration information measured by the first acceleration sensor 111 and the second acceleration sensor 112, respectively, from the sensor unit 110 and also receives pieces of information about the respective positions of the first acceleration sensor 111, the second acceleration sensor 112, and the third acceleration sensor 113 from the position information storage unit 121.

Furthermore, expectation acceleration at a point where the third acceleration sensor 113, that is, the object whose possible crash will be detected, is placed may be calculated by using a method, such as triangulation, on the basis of the pieces of information.

In some embodiments, the calculation unit 122 may receive pieces of acceleration information, measured by, for example, two or more of the plurality of acceleration sensors 111 to 114, from the sensor unit 110, receive pieces of information about the positions of the two or more acceleration sensors from the position information storage unit 121, and calculate expectation acceleration at a point where the third acceleration sensor 113, that is, the object whose possible crash will be detected, is placed on the basis of the pieces of acceleration information and the pieces of position information.

The determination unit 123 receives information about the expectation acceleration of the third acceleration sensor 113 from the calculation unit 122 and receives information about measurement acceleration, measured by the third acceleration sensor 113, from the sensor unit 110. Furthermore, the determination unit 123 may compare the expectation acceleration of the third acceleration sensor 113 with the measurement acceleration of the third acceleration sensor 113. If, as a result of the comparison, a difference between the expectation acceleration and the measurement acceleration is out of a specific reference, for example, a range of 5%, the determination unit 123 may determine that crash has been generated and an outward shape has been deformed at the point where the third acceleration sensor 113 is installed.

Furthermore, the determination unit 123 may determine that crash has been generated at the point where the third acceleration sensor 113 is installed and that an outward shape has been deformed even when the measurement acceleration measured by the third acceleration sensor 113 and received from the sensor unit 110 or the expectation acceleration of the third acceleration sensor 113 measured by the calculation unit 122 exceeds preset reference acceleration (e.g., 5 G).

The crash detection unit 120 may further include a crash amount calculation unit (not shown) for calculating the amount of crash applied to the third acceleration sensor 113 by using a difference between the expectation acceleration and the measurement acceleration of the third acceleration sensor 113.

Here, positions where the first acceleration sensor 111 and/or the second acceleration sensor 112 are installed may be deformed by crash, and thus there may be a difference between the expectation acceleration and the measurement acceleration of the third acceleration sensor 113. In this case, a point where an outward shape has been deformed and a point where the outward shape has not been deformed may be distinguished from each other by calculation according to various combinations of the plurality of acceleration sensors 111 to 114.

If the determination unit 123 determines that an outward shape at the point where the third acceleration sensor 113 is installed has been deformed through the above-described calculation and determination processes, crash information including pieces of information, such as information about the position where the third acceleration sensor 113 is installed, the pieces of acceleration information measured by the first acceleration sensor 111, the second acceleration sensor 112, and the third acceleration sensor 113, the expectation acceleration measured by the calculation unit 122, and the amount of crash applied to the third acceleration sensor 113, may be stored in the crash information storage unit 124.

The crash information stored in the crash information storage unit 124 may be provided to the user of the object whose crash will be detected 10 along with a crash detection signal informing that the crash has been generated in the object whose crash will be detected 10.

A method and apparatus for predicting the acceleration of the third acceleration sensor 113 by using the first acceleration sensor 111 and the second acceleration sensor 112 are described below.

There are various methods of calculating acceleration at a specific point on the basis of pieces of acceleration information and position information at different positions. The following method is only one of the various methods, and the scope of the present invention is not limited to the exemplary method.

Figure 3:
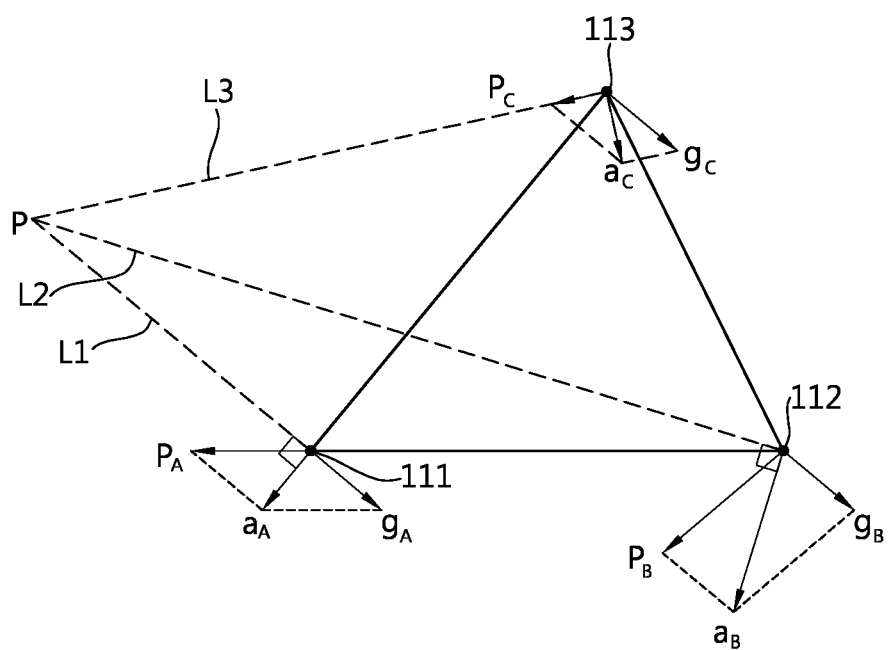
FIG. 3 is a diagram illustrating a method of predicting the acceleration of a third acceleration sensor by using a first acceleration sensor and a second acceleration sensor.

FIG. 3 is a diagram illustrating the method of predicting the acceleration of the third acceleration sensor 113 by using the first acceleration sensor 111 and the second acceleration sensor 112.

As shown in FIG. 3, the first acceleration sensor 111 measures the acceleration of a vehicle PA and the acceleration of gravity $g_A$ at a specific position, and a first composite acceleration vector $a_A$, that is, the sum of the acceleration of a vehicle $P_A$ and the acceleration of gravity $g_A$, is calculated.

Furthermore, the second acceleration sensor 112 measures the acceleration of a vehicle PB and the acceleration of gravity $g_B$ at a specific position, and a second composite acceleration vector $a_B$, that is, the sum of the acceleration of a vehicle $P_B$ and the acceleration of gravity $g_B$, is calculated.

An intersection point P of a straight line $L_1$ orthogonal to the first composite acceleration vector $a_A$ in the first acceleration sensor 111 and a straight line $L_2$ orthogonal to the second composite acceleration vector $a_B$ in the second acceleration sensor 112 may be calculated on the basis of the first composite acceleration vector $a_A$ at the position where the first acceleration sensor 111 is installed, the second composite acceleration vector $a_B$ at the position where the second acceleration sensor 112 is installed, and pieces of information about the positions of the first acceleration sensor 111 and the second acceleration sensor 112 (including coordinates for the position of each of the first and second acceleration sensors 111 and 112 and/or the distance between the first and second acceleration sensors 111 and 112, and the direction angle of each of the first and second acceleration sensors 111 and 112).

Furthermore, a prediction acceleration vector $a_C$ in the third acceleration sensor 113 vertical to a straight line $L_3$ that connects the intersection point P and the third acceleration sensor 113 together may be calculated on the basis of the information about the position of the third acceleration sensor 113.

Meanwhile, the third acceleration sensor 113 measures the acceleration of a vehicle PC and the acceleration of gravity $g_C$ in a specific position, and a third composite acceleration vector $a_C'$, that is, the sum of the acceleration of a vehicle $P_C$ and the acceleration of gravity $g_C$, is calculated.

Furthermore, the third composite acceleration vector $a_C'$ is compared with the prediction acceleration vector $a_C$. If, as a result of the comparison, a difference between the third composite acceleration vector $a_C'$ and the prediction acceleration vector $a_C$ is out of a specific error range, it may be determined that crash has been generated in the object whose crash will be detected 10 and thus an outward shape has been deformed.

The crash detection apparatus 100 may be applied to various targets, such as buildings, vehicles, and vessels and may be used in a crash test in a vehicle. The crash detection apparatus 100 may be installed in the parts of a vehicle, a vessel, and a factory in order to detect whether crash has been applied to the parts or not and/or whether an outward shape has been deformed or not. In case of a battery pack indispensable for the recent electric vehicle, if an outward shape of the battery pack is damaged by crash, the function of the battery pack may be deteriorated or lost. In this case, the crash detection apparatus 100 may be used to detect whether or not crash has been applied to the battery pack or whether or not the battery pack has been broken.

Figure 4:
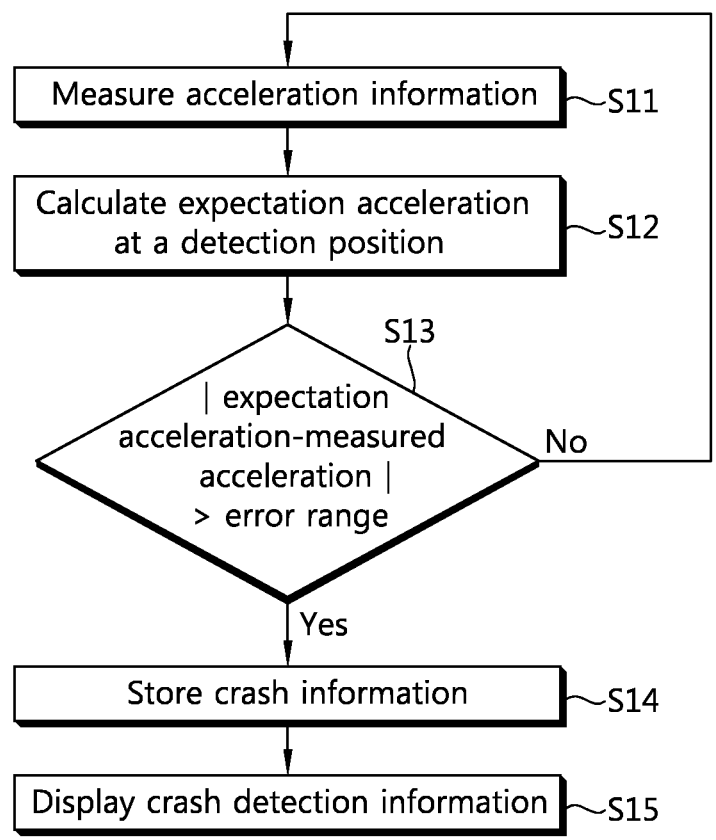
FIG. 4 is a flowchart illustrating a crash detection method according to an embodiment of the present invention.

FIG. 4 is a flowchart illustrating the crash detection method according to an embodiment of the present invention.

As shown in FIG. 4, the crash detection method according to the embodiment of the present invention includes measuring acceleration information at step S11, calculating expectation acceleration at a detection position at step S12, determining whether crash has been generated or not and/or whether an outward shape has been deformed or not at the detection position at step S13, storing crash information at step S14, and displaying crash detection information at step S15.

At step S11 of measuring the acceleration information, the plurality of acceleration sensors installed at different positions may measure accelerations at respective positions where the acceleration sensors are installed. A 3-axis acceleration sensor for measuring the accelerations of 3-axis directions vertical to each other may be used as the acceleration sensor.

At step S12 of calculating expectation acceleration at the detection position, the expectation acceleration at the detection position may be calculated on the basis of the pieces of information the accelerations measured by the plurality of acceleration sensors and pieces of information about the positions of the plurality of acceleration sensors.

The pieces of information about the position of the plurality of acceleration sensors may mean vector information about the distance between the plurality of acceleration sensors and a direction angle of each of the plurality of acceleration sensors and/or coordinate information about coordinates at which each of the plurality of acceleration sensors is installed.

For example, the expectation acceleration of the third acceleration sensor 113 placed at the detection position may be calculated on the basis of pieces of information about accelerations measured by, for example, the first acceleration sensor 111 and the second acceleration sensor 112.

That is, the expectation acceleration of the third acceleration sensor 113 may be calculated by using a method, such as triangulation, on the basis of the pieces of information about the accelerations measured by the first acceleration sensor 111 and the second acceleration sensor 112 and the pieces of information about the positions of the first acceleration sensor 111, the second acceleration sensor 112, and the third acceleration sensor 113.

In some embodiments, the expectation acceleration of the third acceleration sensor 113 may be calculated on the basis of pieces of information about accelerations measured by two or more of the plurality of acceleration sensors and pieces of information about the positions of the two or more acceleration sensors.

At step S13 of determining whether crash has been generated or not and/or whether an outward shape has been deformed or not at the detection position, the expectation acceleration calculated at step S12 of calculating the expectation acceleration of the detection position is compared with measurement acceleration measured by the third acceleration sensor 113 installed at the detection position at step S11 of measuring the acceleration information at the detection position.

If, as a result of the comparison, a difference between the expectation acceleration and the measurement acceleration is out of a specific reference, for example, a range of 5%, it may be determined that crash has been generated and an outward shape has been deformed at the point where the third acceleration sensor 113 is installed.

It may also be determined that crash has been generated and an outward shape has been deformed at the point where the third acceleration sensor 113 is installed when the measurement acceleration or the expectation acceleration exceeds preset reference acceleration (e.g., 5 G).

Meanwhile, an operation on the amount of crash applied to the third acceleration sensor 113 may be further performed on the basis of a difference between the expectation acceleration and the measurement acceleration.

Here, points where the first acceleration sensor 111 and/or the second acceleration sensor 112 are installed may be deformed by crash, and thus there may be a difference between the expectation acceleration and the measurement acceleration of the third acceleration sensor 113. In this case, a point where an outward shape has been deformed and a point where the outward shape has not been deformed may be distinguished from each other by calculation according to various combinations of the plurality of acceleration sensors 111 to 114 in order to precisely detect a point where crash has been generated and/or an outward shape has been deformed.

At step S14 of storing crash information, if it is determined that crash has been generated and an outward shape has been deformed at step S13 of determining whether crash has been generated or not and/or whether an outward shape has been deformed or not at the detection position, crash information including pieces of information, such as information about the position where the third acceleration sensor 113 is installed, the amount of crash applied to the acceleration sensor 113 where the crash has been generated, the acceleration information measured by the third acceleration sensor 113 where the crash has been generated, the expectation acceleration of the acceleration sensor 113 where the crash has been generated, and the pieces of information about the accelerations measured by the first acceleration sensor 111 and the second acceleration sensor 112 in calculating the expectation acceleration, may be stored.

At step S15 of displaying crash detection information, if it is determined that crash has been generated and an outward shape has been deformed, a crash detection signal, informing that the crash has been generated, and/or the crash information may be displayed to a user.

If the function continues to be maintained even after the crash is generated, the plurality of acceleration sensors may continue to measure their accelerations and detect whether additional crash has been generated based on the measured accelerations.

Figure 5:
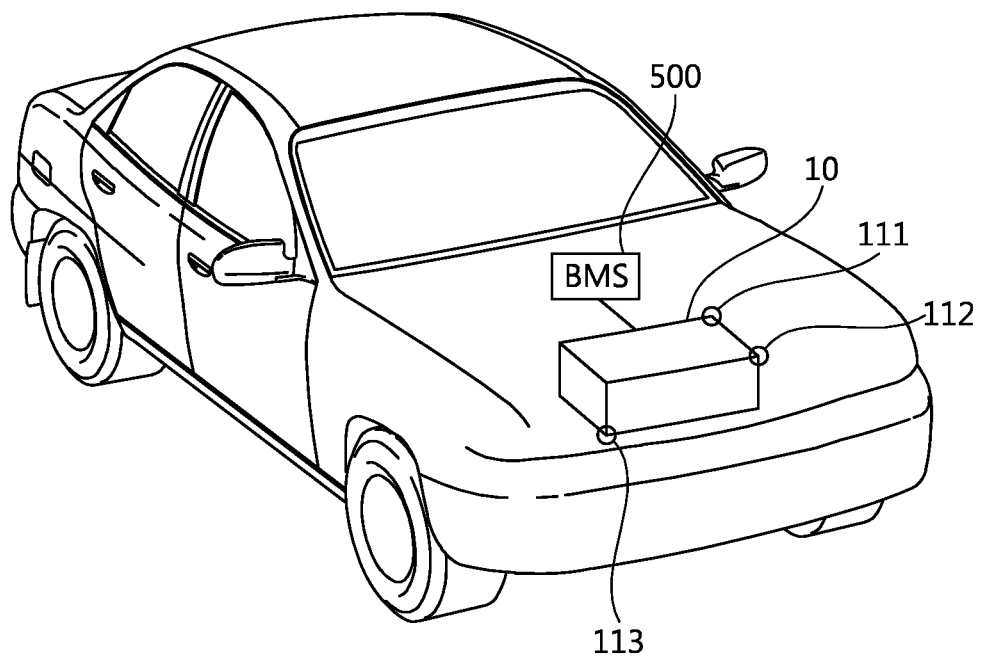
FIG. 5 shows a vehicle to which the embodiment of the present invention is applied.

FIG. 5 shows a vehicle to which the embodiment of the present invention is applied. A battery pack 10 disposed in an electric vehicle is used as the object whose crash will be detected. The battery pack 10 is an electrical charging source used to drive the electric vehicle, and it may include one or more secondary battery cells.

For example, the first acceleration sensor 111, the second acceleration sensor 112, and the third acceleration sensor 113 may be disposed on the outside of the battery pack 10. The first acceleration sensor 111, the second acceleration sensor 112, and the third acceleration sensor 113 measure the acceleration of the electric vehicle.

A Battery Management System (BMS) 500 may monitor the charging state of the battery pack 10 and embody the proposed crash detection method. The BMS 500 may measure the expectation acceleration of the third acceleration sensor 113 on the basis of pieces of measurement information measured by the first acceleration sensor 111 and the second acceleration sensor 112, compare the expectation acceleration with measurement acceleration measured by the third acceleration sensor 113, and detect whether crash has been generated and/or whether an outward shape has been deformed or not in the battery pack 10 according to a result of the comparison.

If an outward shape of the battery pack 10 is deformed, the BMS 500 may prohibit the battery pack 10 from being charged or stop the supply of power to the electric vehicle. Accordingly, a breakdown of the electric vehicle resulting from crash against the battery pack 10 can be prevented.

The embodiments of the present invention described above and shown in the drawings should not be construed as limiting the technical scope of the present invention. The scope of the present invention is restricted by only the claims, and a person having ordinary skill in the art to which the present invention pertains may improve and modify the technical spirit of the present invention in various forms. Accordingly, the modifications and modifications will fall within the scope of the present invention as long as they are evident to those skilled in the art.

The invention claimed is:

1. An apparatus for crash detection, the apparatus comprising:
    first, second, and third acceleration sensors installed at different positions of an object whose crash is to be detected; and
    a crash detection unit configured to:
        calculate expectation acceleration of the third acceleration sensor based on measurement information measured by the first acceleration sensor and the second acceleration sensor, and
        detect whether a shape of the object has been deformed or not by comparing the expectation acceleration with a measured acceleration measured by the third acceleration sensor.

2. The apparatus of claim 1, wherein the crash detection unit is configured to detect that the shape of the object has been deformed if a difference between the expectation acceleration and the measured acceleration is out of a predetermined range.

3. The apparatus of claim 2, wherein the crash detection unit includes a crash information storage unit configured to store information regarding at least one of a position where the third acceleration sensor is installed, the measurement information measured by the first acceleration sensor and the second acceleration sensor, the expectation acceleration, and the measured acceleration when the shape of the object is determined as deformed.

4. The apparatus of claim 1, wherein the crash detection unit includes a position information storage unit configured to store position information including vector information about a distance between the first, the second and the third acceleration sensors and directions of the first, the second, and the third acceleration sensors.

5. The apparatus of claim 4, wherein the crash detection unit is configured to calculate the expectation acceleration of the third acceleration sensor based on the position information and the measurement information measured by the first acceleration sensor and the second acceleration sensor.

6. The apparatus of claim 1, wherein the object includes a battery pack disposed in a vehicle, and the first, the second, and the third acceleration sensors measure accelerations of the vehicle.

7. The apparatus of claim 1, wherein the crash detection unit is configured to calculate an amount of crash at a position where the third acceleration sensor is installed using a difference between the expectation acceleration and the measured acceleration.

8. A method for crash detection, the method comprising:
    measuring a first acceleration at a first position of an object whose crash is to be detected;
    measuring a second acceleration at a second position of the object;
    calculating an expectation acceleration at a third position of the object based on the first acceleration and the second acceleration;
    measuring a third acceleration at the third position of the object; and
    detecting whether a shape of the object has been deformed or not by comparing the expectation acceleration with the third acceleration.

9. The method of claim 8, wherein the shape of the object is detected as deformed if a difference between the expectation acceleration and the third acceleration is out of a predetermined range.

10. The method of claim 8, wherein the expectation acceleration is calculated based on the first acceleration, the second acceleration and position information about the first position and the second position.

11. The method of claim 8, wherein the object includes a battery pack disposed in a vehicle, and the first, the second and the third acceleration are accelerations measured at the vehicle.

12. The method of claim 8, further comprising:
    storing crash information regarding at least one of the third position, the first acceleration, the second acceleration, the expectation acceleration, and the third acceleration when the shape of the object is detected as deformed.

13. The method of claim 12, further comprising
    displaying the crash information together with a crash detection signal informing the detection of crash when the shape of the object is detected as deformed.

14. The method of claim 8, further comprising:
    calculating an amount of crash at the third position by using a difference between the expectation acceleration and the third acceleration.

15. A method for crash detection, the method comprising:
    measuring a plurality of accelerations at a plurality of positions through a plurality of acceleration sensors;
    calculating an expectation acceleration at a detection position by using at least two of the plurality of accelerations; and
    determining that deformation occurs at the detection position if a difference between the expectation acceleration and the acceleration at the detection position is out of a predetermined range.

16. The method of claim 15, wherein an object whose crash is to be detected is a battery pack disposed in a vehicle, and the plurality of acceleration sensors measures accelerations of the vehicle.

17. The method of claim 15, further comprising:
displaying a crash detection signal informing the detection of crash when deformation occurs at the detection position.

18. The method of claim 17, further comprising:
displaying crash information regarding at least one of the detection position, the expectation acceleration, and the acceleration at the detection position when deformation occurs at the detection position.

19. The method of claim 15, further comprising:
calculating an amount of crash at the detection position using a difference between the expectation acceleration and the acceleration at the detection position.

20. An apparatus for crash detection, the apparatus comprising:
a plurality of acceleration sensors installed at different positions of an object whose crash is to be detected; and
a crash detection unit configured to detect whether a shape of the object has been deformed or not by using the plurality of acceleration sensors, wherein the crash detection unit comprises:
a calculation unit configured to calculate an expectation acceleration at a detection position based on acceleration information measured by at least two of the plurality of acceleration sensors except an acceleration sensor installed at the detection position, and
a determination unit configured to compare the expectation acceleration with an acceleration measured by the acceleration sensor at the detection position and determine that deformation occurs at the detection position if a difference between the expectation acceleration and the acceleration at the detection position is out of a predetermined range.

* * * * *